Nov. 22, 1966   M. EPHRAIM, JR   3,286,459
TURBINE INLET SCREEN ASSEMBLY
Filed Dec. 31, 1963                                 2 Sheets-Sheet 1

INVENTOR.
Max Ephraim, Jr.
BY
C. L. Spencer
ATTORNEY

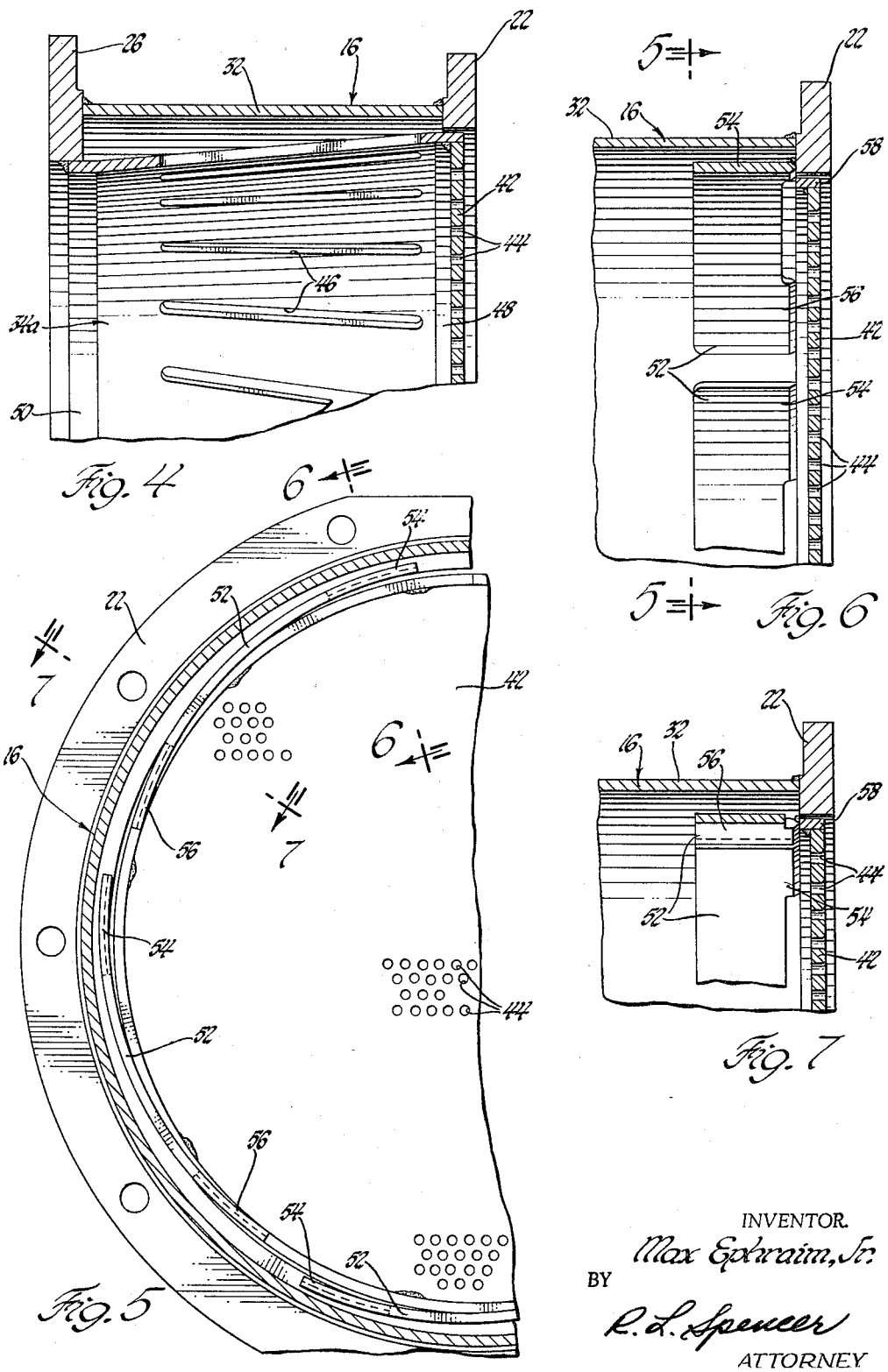

United States Patent Office 3,286,459
Patented Nov. 22, 1966

3,286,459
TURBINE INLET SCREEN ASSEMBLY
Max Ephraim, Jr., Chicago, Ill., assignor to General Motors Corporation, Detroit, Mich., a corporation of Delaware
Filed Dec. 31, 1963, Ser. No. 334,852
3 Claims. (Cl. 60—13)

This invention relates to a screen assembly and more particularly to a screen assembly for use in conjunction with an exhaust gas driven turbine wherein the exhaust gas used to drive the turbine is derived from an internal combustion engine. When using the exhaust gas of an internal combustion engine to drive a turbine it is desirable that means be provided to prevent foreign matter from the engine from entering the turbine.

Internal combustion engine exhaust gases are often used to drive an engine supercharger to provide greater engine power and efficiency. At times, the exhaust gas from the engine contains small pieces of foreign matter and failed parts, such as pieces of engine valves, etc. When such small pieces are passed into the turbocharger inlet, it is possible for the pieces to damage and ruin the turbine blading of the turobcharger.

A problem arising from the use of a screen in an engine exhaust manifold is that of screen cracking due to internal stresses set up in the screen from temperature differentials. When the screen is secured directly to flanges of adjacent manifold sections, the screen and manifold are at different temperatures and subjected to different rates of expansion such that internal stresses in the screen cause premature screen breakage and relatively short useful life. The screen normally heats up at a faster rate than the manifold when subjected to high temperature exhaust gases and cannot long withstand the internal stresses without breaking down.

Accordingly, an object of this invention is to provide a screen and screen support for an exhaust gas screen for an internal combustion engine having a long useful life wherein the screen is disposed entirely within the exhaust manifold.

Another object of this invention is to provide a screen assembly for insertion in the exhaust manifold of an internal combustion engine arranged to prevent passage of foreign matter, such as failed engine parts, from an engine into a turbocharger driven by engine exhaust gas.

Another object of this invention is to provide a screen assembly for an exhaust manifold which may be mounted within the exhaust manifold in such a manner that the screen may expand uniformly without setting up internal stresses and still be maintained in operating position.

A further object of this invention is to provide a screen assembly having one portion contacting the manifold and an intermediate portion extending to the screen portion for supporting the screen portion within the manifold in such a manner that the screen may expand freely without being affected by the contacted area thus preventing the internal stresses within the screen.

A more specific object of this invention is to provide an engine exhaust screen adapted to be inserted in an engine exhaust manifold and incorporating a generally tubular support whereby the screen is retained within the exhaust manifold in spaced relationship with respect to the manifold and provided with a series of spaced screen support fingers adapted to individually flex as the screen expands in response to rise in temperature.

Another more specific object of this invention is to provide an engine exhaust screen adapted to be inserted in an engine exhaust manifold incorporating a generally tubular support whereby one end of the support is connected to the screen for retaining the screen within the exhaust manifold in spaced relationship with respect to the manifold and the other end of the tubular support is secured to the exhaust manifold with a series of slots provided in the middle portion of the tubular support to facilitate flexing of the support as the screen expands in response to rise in temperature.

A further more specific object of this invention is to provide a support means for an engine exhaust screen adapted to be positioned transversely in the exhaust manifold for screening foreign material from exhaust fluids wherein the support means consists of a plurality of strips having one end secured to the exhaust manifold and the other end secured to the screen for supporting the screen whereby the strips may flex as the screen expands in response to rise in temperature.

A further object of this invention is to provide an exhaust gas screen and screen retainer sub-assembly adapted to be assembled to an engine exhaust manifold wherein the sub-assembly serves to connect the engine exhaust manifold to a turbocharger and is quickly and easily removable and replaceable for simple inexpensive servicing and for removing foreign matter from the engine exhaust manifold.

These and other objects of the invention will become more apparent as reference is had to the following specification and drawings wherein:

FIGURE 4 is a sectional view, with portions cut away, of a second embodiment of the screen assembly showing the manner in which a screen assembly utilizing a slotted sleeve is mounted within the manifold for supporting a screen and preventing contact of the screen with the internal surface of the exhaust manifold.

FIGURE 5 is a view taken in the direction of the arrows 5—5 of FIGURE 6, with sections cut away, illustrating a portion of the supported screen and supporting strips of the third embodiment of this invention.

FIGURE 6 is a view taken in the direction of the arrows 6—6 of FIGURE 5, with sections cut away, illustrating the manner in which the supporting strips of the third embodiment of my invention are secured to the flange of the screen assembly.

FIGURE 7 is a view taken in the direction of the arrows 7—7 of FIGURE 5, with sections cut away, showing the manner in which the supporting strips of the third embodiment are attached to the support ring of the screen.

Figure 1:
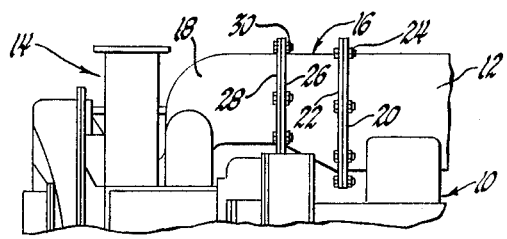
FIGURE 1 is a side view of a portion of an exhaust manifold and supercharger having the subject screen assembly mounted between the manifold and the turbocharger.
Figure 2:
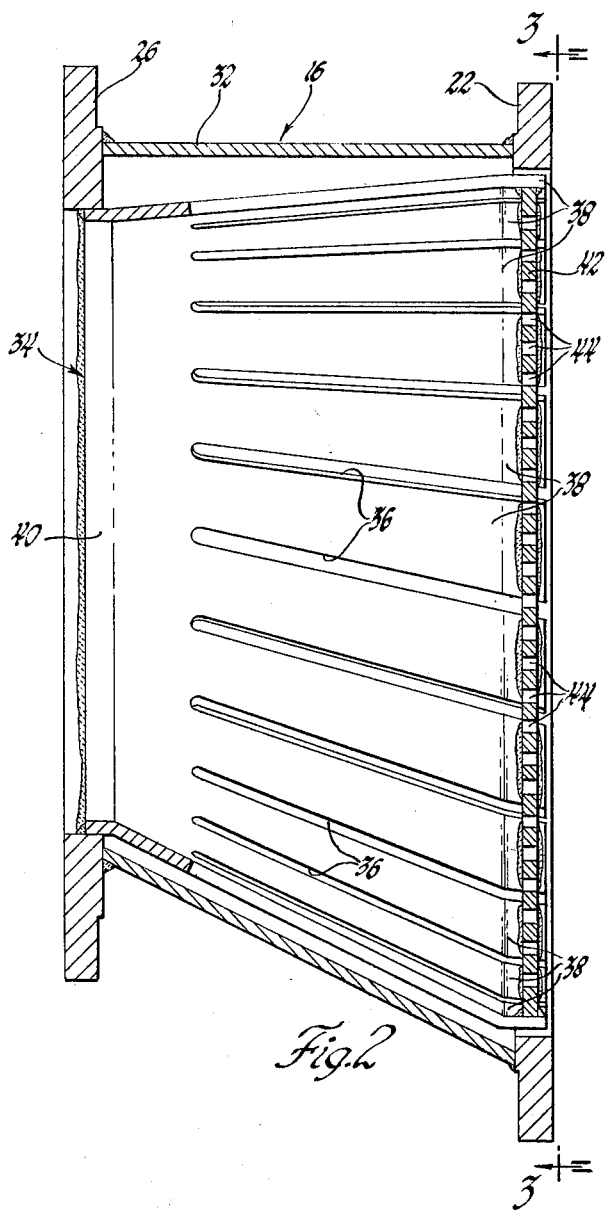
FIGURE 2 is a sectional view of one embodiment of the screen assembly showing the manner in which a screen assembly having finger portions is mounted within the manifold for preventing contact of the screen with the internal surfaces of the exhaust manifold.

Referring to FIGURE 1, there is shown an exhaust manifold 12 for an internal combustion engine 10 and a turbocharger 14 adapted to be driven by engine exhaust gases discharged by engine 10 through manifold 12. Turbocharger 14 is used to compress air to be conducted to engine 10 through an engine intake manifold (not shown). An exhaust gas turbocharger inlet manifold 18 is connected to engine exhaust manifold 12 by means of an adpater or coupling 16. The coupling 16 is detachably secured to exhaust manifold 12 by means of bolts 24 extending through flanges 20 and 22 formed on manifold 12 and coupling 16 and is also detachably secured to turbocharger intake manifold 18 by means of bolts 30 extending through flanges 26 and 28 formed on coupling 16 and manifold 18, respectively. Coupling 16 is thereby readily removable from the assembly.

Figure 3:
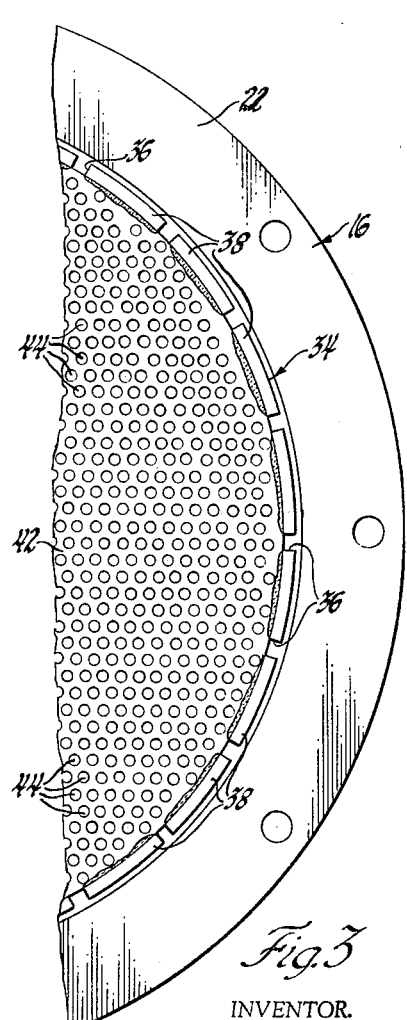
FIGURE 3 is a view taken in the direction of the arrows 3—3 of FIGURE 2, with sections cut away, illustrating the position of the screen and supporting fingers within the manifold.

Details of the construction of coupling 16 are best shown in FIGURES 2, 3, 4 and 5. As shown, coupling or adapter 16 includes an outer tubular housing portion 32 having upstanding flanges 22 and 26 thereon. In the first embodiment of this invention, illustrated in FIGURES 2 and 3, a tubular screen support member 34 is disposed within the tubular outer housing 32 and is welded or otherwise suitably secured at one end to flange 26. In the assembly, support member 34 extends axially forwardly from flange 26 toward engine manifold 12 and in spaced relationship with respect to outer housing 32 and terminates in the plane of flange 22. Otherwise stated, screen support member 34 is coextensive in length with the outer housing 32 and is spaced therefrom within the housing. Screen support 34 is slotted axially around its periphery with a plurality of spaced slots 36. Slots 36 extend rearwardly from the leading edge of support 34 substantially throughout the length of support 34 so as to provide a series of spaced fingers 38 joined together by a continuous annular base portion 40. A circular screen 42 having a multiplicity of openings 44 therein is held in position by fingers 38. As best shown in FIGURE 3, fingers 38 extend around the periphery of the cylindrical screen and each finger is welded or otherwise secured to the peripheral edge of the screen. In the assembly, the ends of the fingers adjacent the screen are spaced inwardly from flange 22 and housing 32 to permit expansion of the screen and fingers.

In the second embodiment, illustrated in FIGURE 4, a tubular screen support member 34a is disposed within the tubular outer housing 32 and is welded or otherwise suitably secured at one end to flange 26. In assembly, support member 34a extends axially forwardly of flange 26 toward engine manifold 12 and in spaced relationship with respect to outer housing 32 and terminates in the plane of flange 22, as the support member 34 of the first embodiment. Tubular screen support 34a is slotted axially around its periphery with the slots 46 being spaced rearwardly from the continuous leading edge portion 48 substantially throughout the length of support 34a to a continuous annular base portion 50. The circular screen 42 is secured at its peripheral edge to the leading edge portion 48 by welding or other suitable means. In assembly, the leading edge portion 48 is spaced inwardly from flange 22 and housing 32 to permit expansion of the screen and support member.

In the third embodiment, illustrated in FIGURES 5, 6 and 7, the circular screen 42 is supported in spaced relationship to the inner surface of the flange 22 by a plurality of support strips 52 radially spaced about the periphery of the screen 42.

The strips 52 have one end 54 secured to the flange 22 by welding or other suitable means and the other end 56 is welded or suitably secured to an annular support ring 58 which is welded or suitably secured to the periphery of the screen 42.

The space between the fingers 38, leading edge of the support member 48 or support ring 58 and the flange 22 in the plane of the screen is such as to prevent pieces of foreign matter that would not pass through the screen openings from by-passing the screen.

In operation, when the coupling 16 is placed in the complete assembly to conduct engine exhaust gas from manifold 12 to manifold 18, hot engine exhaust gases will normally raise the temperature of screen 42 at a faster rate than that of the outer housing 32 of coupling 16. The rate of expansion of screen 42 is higher than that of coupling 16 due to this temperature differential. Also, since the screen 42 is disposed in the assembly in the exhaust flow and is spaced from the point of attachment of support members 34 and 34a to the cooler flange 26 and strips 52, to cooler flange 22, the screen will expand at a more rapid rate than the supporting flanges. Fingers 38, strips 52 and sleeve 34a will accommodate radial expansion of screen 42 by flexing and will prevent internal stresses which would arise in the screen 42 were the screen rigidly secured to coupling 16.

There have been provided screen assemblies particularly adapted to screen foreign matter from an engine exhaust manifold which are designed for long useful life and to withstand repeated heating and cooling cycles without cracking due to internal stresses arising from such heating and cooling. In addition, the screen assemblies are readily removable for replacement or service purposes and for the purpose of removing foreign matter trapped by the screen in manifold 12.

While but three embodiments of the invention have been shown and described, it will be evident that numerous changes and modifications may be made therein. It is, therefore, to be understood that it is not intended to limit the invention to the embodiments shown but only by the scope of the claims which follow:

I claim:

1. In an internal combustion engine having an exhaust gas driven turbine, a screen assembly covering the inlet to said turbine and protecting said turbine from potentially damaging particulate matter in the exhaust gases, said screen assembly comprising a housing portion mounted at the inlet to said turbine, said housing portion defining an exhaust gas flow path therethrough, a screen portion disposed within said housing across the exhaust gas flow path, said screen portion being subject to radial thermal expansion toward said housing portion during engine operation, said screen portion being slightly spaced radially from said housing portion to permit thermal expansion of said screen portion relative to said housing portion, and support means mounting said screen portion on said housing portion, said support means including a tubular support member having at one end a continuous annular base portion rigidly secured to said housing portion and having at the opposite end an edge portion rigidly secured to said screen portion, said support member having a plurality of peripherally spaced slots extending longitudinally from said base portion through said edge portion to form a plurality of flexible finger portions which support said screen portion during thermal expansion relative to said housing portion.

2. In an internal combustion engine having an exhaust gas driven turbine, a screen assembly covering the inlet to said turbine and protecting said turbine from potentially damaging particulate matter in the exhaust gases, said screen assembly comprising a housing portion mounted at the inlet to said turbine, said housing portion defining an exhaust gas flow path therethrough, a screen portion disposed within said housing across the exhaust gas flow path, said screen portion being subject to radial thermal expansion toward said housing portion during engine operation, said screen portion being slightly spaced radially from said housing portion to permit thermal expansion of said screen portion relative to said housing portion, and support means mounting said screen portion on said housing portion, said support means including a tubular support member having at one end a continuous annular base portion rigidly secured to said housing portion and having at the opposite end a continuous annular edge portion rigidly secured to said screen portion, said support member having intermediate said base and edge portions a plurality of longitudinally extending slots peripherally spaced thereabout to form a plurality of flexible finger portions which support said screen portion relative to said housing portion during thermal expansion.

3. In an internal combustion engine having an exhaust gas driven turbine, a screen assembly covering the inlet to said turbine and protecting said turbine from potentially damaging particulate matter in the exhaust gases, said screen assembly comprising a housing portion mounted at the inlet to said turbine, said housing portion defining an exhaust gas flow path therethrough, a screen portion disposed within said housing across the exhaust gas flow path, said screen portion being subject to radial thermal expansion toward said housing portion during engine operation, said screen portion being slightly spaced radially from said housing portion to permit thermal expansion of said screen portion relative to said housing portion, and support means mounting said screen portion on said housing portion, said support means including a plurality of support strips spaced about the periphery of said screen portion, each strip being rigidly secured along one side thereof adjacent one end thereof to said screen portion, said strips extending arcuately out to said housing portion in a direction generally transverse to the exhaust gas flow path, each strip being rigidly secured along said one side thereof adjacent the opposite end thereof to said housing portion and being flexible to support said screen portion during thermal expansion relative to said housing portion.

References Cited by the Examiner

UNITED STATES PATENTS

| | | | |
|---|---|---|---|
| 2,534,138 | 12/1950 | Marshall | 55—306 |
| 2,623,610 | 12/1952 | Buechel | 55—306 |
| 2,837,169 | 6/1958 | Sawyer | 55—267 X |
| 2,931,460 | 4/1960 | McEachern | 55—306 |
| 3,163,984 | 1/1965 | Dumont | 60—13 |
| 3,203,158 | 8/1965 | Zadra | 55—505 |

FOREIGN PATENTS

| | | |
|---|---|---|
| 365,861 | 1/1932 | Great Britain. |
| 700,182 | 11/1953 | Great Britain. |

ROBERT F. BURNETT, *Primary Examiner.*

UNITED STATES PATENT OFFICE
CERTIFICATE OF CORRECTION

Patent No. 3,286,459                                 November 22, 1966

Max Ephraim, Jr.

It is hereby certified that error appears in the above numbered patent requiring correction and that the said Letters Patent should read as corrected below.

Column 1, line 24, for "turobcharger" read -- turbocharger --; column 2, line 67, for "adpater" read -- adapter --; column 4, lines 67 and 68, for "finger portions which support said screen portion relative to said housing portion during thermal expansion" read -- finger portions which support said screen portion during thermal expansion relative to said housing portion --.

Signed and sealed this 12th day of September 1967.

(SEAL)
Attest:

ERNEST W. SWIDER                                      EDWARD J. BRENNER
Attesting Officer                                           Commissioner of Patents